3,124,538
METHOD FOR CONVERSION OF CESIUM ALUM TO RADIATION SOURCE MATERIAL
Robert E. Lewis, Kingston, Tenn., assignor to the United States of America as represented by the United States Atomic Energy Commission
No Drawing. Filed Mar. 1, 1963, Ser. No. 262,277
6 Claims. (Cl. 252—301.1)

My invention relates to the processing of radioactive cesium and more particularly to the conversion of cesium 137 alum to a material suitable for incorporation in radiation sources.

The fission product isotope cesium 137 is useful for numerous applications such as in medical teletherapy devices, radiographic equipment and thermoelectric generators. The usual source of this isotope is an aqueous fission product solution obtained in the chemical reprocessing of irradiated nuclear reactor fuel. Cesium 137 is recovered from such solutions by carrier precipitation of cesium alum with ammonium alum. The cesium alum is then purified and separated from ammonium alum by repeated fractional crystallization.

Various problems have been encountered in converting cesium alum to a high-activity radiation source with properties suitable for use in thermoelectric generators. For this purpose maximum activity per unit volume is desired along with stable physical and chemical properties, and in particular a high melting point, low solubility in water and chemical inertness. These properties have been attained by incorporating the cesium as a component of a glass body, but preparation of the cesium-bearing glass has been beset with difficulty. Cesium alum is not suitable for direct incorporation in glass because the aluminum and sulfate constituents of the alum interfere with glass formation. Cesium-bearing glass has been prepared by converting the cesium alum to a glass-forming cesium compound and combining with other glass ingredients such as silica. In one method cesium-bearing silicate glass has been prepared by heating cesium carbonate with silica, but a substantial portion of the cesium is volatilized, resulting in decreased activity in the source and a severe contamination hazard.

Volatility has been minimized in another process wherein cesium is precipitated from cesium chloride solution as cesium tetraphenyl boron and the precipitate is heated with silica to produce a cesium borosilicate glass. This process, however, is disadvantageous in the tedious procedure required for preparation of the cesium chloride solution from cesium alum, in the voluminous type of precipitate obtained, and in the poor strength of the product glass. Conversion of cesium alum to a cesium chloride solution requires a series of process steps, each involving remote manipulation in a thickly shielded hot-cell facility. Cesium alum is first dissolved in hydrochloric acid and cesium is precipitated as cesium chloroplatinate by the addition of chloroplatinic acid. This precipitate is dissolved and the platinum therein is reduced to insoluble metal with hydrazine hydrate, leaving cesium chloride in solution along with ammonium chloride. The solution is then evaporated or treated with acid to remove the ammonium chloride, and the platinum precipitate is converted to chloroplatinic acid and recycled. It may be seen that production of large quantities of high-activity material is hindered by this procedure. In addition, the cesium tetraphenyl boron precipitate is voluminous and cumbersome to handle. The borosilicate glass produced by this process is fragile and difficult to fabricate without cracking, and the shape of the product has been limited to compact cylinders or thick bodies. For certain radiation-source applications cesium-bearing glass in the form of relatively thin bars is desired.

It is, therefore, an object of my invention to provide a method of separating cesium values from aluminum and sulfate values.

Another object is to provide a method of converting cesium alum to a cesium compound suitable for incorporation in a glass body.

Another object is to provide a cesium recovery process wherein cesium is removed from solution as a dense, readily filterable material.

Another object is to provide a simple process for incorporating cesium in glass wherein a minimum number of process steps are employed.

Another object is to provide a method of incorporating cesium values into glass bodies of relatively thin configuration.

Other objects and advantages of my invention will be apparent from the following detailed description and claims appended hereto.

In accordance with my invention cesium values are separated from an aqueous solution containing the same, together with aluminum values and sulfate values, by reacting said cesium values with oxalic acid, crystallizing cesium tetraoxalate in the resulting solution, and separating the cesium tetraoxalate crystals from the remaining solution. The cesium tetraoxalate is then heated to produce a dehydrated solid product principally comprising cesium acid oxalate, which product is suitable for incorporation in a glass body. Cesium is separated from the other constituents of cesium alum and is converted to glass-forming material in a minimum of simple process steps. The crystallized cesium tetraoxalate is dense and easily handled, in contrast to the previously employed cesium tetraphenyl boron precipitate, so that much larger quantities of material may be processed in the same equipment. The cesium acid oxalate product is amenable to incorporation into relatively thin glass bodies with properties suitable for use in thermoelectric generators.

The starting material for the method of my invention is normally cesium alum, $Cs_2SO_4 \cdot Al_2(SO_4)_3 \cdot 24H_2O$, in combination with small amounts of ammonium alum, $(NH_4)_2SO_4 \cdot Al_2(SO_4)_3 \cdot 24H_2O$, obtained from fission product waste solutions. Ammonium ions crystallize as an oxalate along with cesium, but any ammonium oxalate in the crystallized solids is removed by volatilization in subsequent heating steps. It is preferred, however, to separate the bulk of the ammonium alum from the cesium alum as described above prior to the reaction with oxalic acid in order to keep the volume of crystallized solids to a minimum. The chief significance of the crystallization step in the present process is that cesium is crystallized, while aluminum and sulfate ions, which interfere with glass formation, remain in solution. Other impurities such as Fe (III) and Cr (III) may also be present, and these impurities likewise remain in solution.

Cesium tetraoxalate, $CsH_3(C_2O_4)_2 \cdot 5H_2O$, is formed by reaction of cesium values with oxalic acid in an aqueous system. In a preferred separation procedure for effecting this reaction cesium alum is dissolved by slurrying in an aqueous oxalic acid solution. Although cesium alum may be dissolved at room temperature, a temperature of about 50° C. to 70° C. is preferred because of the high solubility obtained. Above 70° C. the oxalic acid tends to sublime. The concentration of oxalic acid is not critical, but about 0.8 molar to 1.1 molar is preferred. The cesium alum may be added at any concentration up to saturation, which is about 200 grams per liter under the preferred conditions given above. A lower concentration of about 50 to 100 grams per liter is preferred, however, since maximum separation from aluminum is obtained at this level. Cesium tetraoxalate is then crystallized by cooling the solution to a temperature below 20° C., and preferably to about 16° C. In order to obtain maximum separation from aluminum, the solution is held at a temperature of about 28° C. to 32° C. for a period of at least 5 minutes, and preferably for about 10 minutes, during cooling and is then further cooled to below 20° C. at a rate not exceeding about 30° C. per hour. This procedure allows formation of seed crystals of cesium tetraoxalate without co-crystallization of aluminum. The rate of cooling the initial heated solution to the holding temperature for seeding (28° C. to 32° C.) is not critical. Under typical conditions, e.g., 100 grams cesium alum per liter, 1.1 molar oxalic acid and cooling from 70° C. to 30° C. over ½ hours, holding at 30° C. for 10 minutes and cooling to 16° C. over ½ hour, 25 to 30 percent of the cesium along with about 99.8 percent of the aluminum and substantially all of the sulfate remains in solution. Recovery of this portion of the cesium may be effected by crystallizing with ammonium alum or by recycling the solution to the alum precipitation process wherein cesium is initially separated from fission product solution. The cesium remaining in solution may also be recovered by adding a small amount of ammonium ion, e.g., a 0.1 molar solution, and co-crystallizing cesium with ammonium oxalate at a temperature below 20° C.

The cesium tetraoxalate is in the form of a dense, crystalline material which is readily separated from the mother liquor by conventional filtration.

To provide the cesium in a form suitable for incorporation in glass the cesium tetraoxalate is heated to a temperature of about 170° C. to 20° C. and held at this temperature for a period of at least about 2 hours. Under these conditions non-radioactive cesium tetraoxalate would be converted to cesium acid oxalate, $CsHC_2O_4$. With highly radioactive cesium 137, however, the product of this step comprises principally cesium acid oxalate in combination with decomposition products thereof, probably cesium carbonate and cesium bicarbonate. As used in the present specification and claims, the term "cesium acid oxalate product" is intended to refer to the product of this heating step. The cesium acid oxalate product is obtained in the form of coarse chunks. In order to ensure homogeneity in glass formation this material is comminuted prior to mixing with other glass-forming ingredients. Grinding to a particle size of 70 to 325 mesh (U.S. standard) is suitable for this purpose.

If other compounds of cesium, rather than a cesium-bearing glass, are desired, the cesium acid oxalate product may be heated to 400° C. for a period of at least 2 hours for complete conversion to cesium carbonate. Cesium carbonate is readily convertible to other useful forms such as cesium chloride by previously known methods.

Cesium-bearing glass is obtained by combining the cesium acid oxalate product with glass-forming ingredients, heating the resulting mixture and allowing the melt to solidify. My invention is not to be understood as limited to a particular glass composition, and the cesium acid oxalate product may be incorporated in any conventional glass-forming mixture. It is preferred, however, to combine the cesium acid oxalate product at a proportion of about 14 to 61 weight percent of the mixture with 30 to 62 weight percent silica, 8 to 13 weight percent cadmium oxide and 0 to 11 weight percent lithium carbonate. Glass of this composition exhibits properties favorable to radiation-source use, namely, relatively low aqueous solubility of the cesium, high proportion of radioactive cesium, high strength and ease of fabrication without cracking. Relatively thin bars, e.g., 10 inches long by 1.25 inches wide by 0.25 inch thick, may be readily prepared by melting in a graphite mold. Other materials which may be incorporated in the glass-forming mixture include barium oxide, strontium oxide and zinc oxide. The composition of the mixture may be adjusted in accordance with previously known techniques to produce the desired properties in the glass. For example, cadmium oxide lowers the melting point to allow easier fabrication and decreases the solubility of the cesium, and lithium oxide increases the fluidity of the melt.

In the course of heating the mixture to its melting point, the cesium acid oxalate product is decomposed to cesium oxide which reacts with the other oxides to produce glass. The melting point of the preferred compositions given above is normally within the range of about 1150° C. to 1250° C. In order to ensure complete removal of gases it is preferred to maintain the mixture in a molten state for a period of at least about 3 hours.

The melt is then cooled to form solid glass. It is preferred to cool from the melting point to about 500° C. at a temperature decrease rate of about 100° C. per hour and then to anneal the glass by holding at 450° C. to 500° C. for at least about 3 hours. The annealed glass is then further cooled to room temperature at a rate of about 100° C. per hour.

Radiation sources of the size and shape desired may be fabricated by conventional techniques such as melting in a graphite mold.

Volatilization of cesium is minimized in the process described above, less than 0.01 percent being volatilized under the preferred conditions. The product glass incorporates a high level of cesium 137 activity, i.e., up to 17 curies per gram, in a stable, relatively insoluble form. For typically high-activity glass the leach rate in water is about 1.6 milligrams cesium per square centimeter per day.

My invention is further illustrated by the following specific examples.

*Example I*

Fifteen liters of a solution containing 6300 grams of oxalic acid were mixed with 35 liters of a slurry containing 4200 grams of cesium alum, and the resulting mixture was heated to 70° C. for 15 minutes. The resulting solution was cooled to 30° C. over ½ hour, held at 30° C. for 10 minutes, and then cooled to 15 C. over ½ hour to produce acesium tetraoxalate precipitate. The precipitate was recovered by filtration and the cesium and aluminum values contained therein were determined. 70 to 75 percent of the starting cesium was present in the precipitate, with less than 0.1 percent of the aluminum.

*Example II*

Cesium-bearing glass was prepared by the following procedure: A quantity of cesium tetraoxalate was heated to 200° C. for 2 hours to produce cesium acid oxalate in chunk form. The chunks were ground to —200 mesh (U.S. standard) and 258.5 grams of the resulting powder was blended with 11.1 grams lithium carbonate, 38.4 grams cadmium oxide and 162.0 grams silica. The blended powder was placed in a graphite boat, heated to the melting point (1200° C.) and maintained in a molten state for 3 hours. The furnace was then cooled to 495° C. and held at that temperature for 3 hours to anneal the resulting glass. The composition of the glass was as follows: $Li_2O$, 4.5 grams; $Cs_2O$, 155.1 grams; CdO, 38.4 grams; and $SiO_2$, 162.0 grams.

*Example III*

Cesium alum containing 31,000 curies of cesium 137 activity (900 grams cesium) was converted to cesium tetraoxalate by the following procedure: The cesium alum was dissolved in 45 liters of 1.1 molar aqueous oxalic acid solution at a temperature of 70° C. to produce a cesium concentration of 20 grams per liter (87 grams cesium alum per liter). The resulting solution was cooled to 30° C. over ½ hour, held at 30° C. for 10 minutes, and then cooled to 16° C. over ½ hour, producing crystallized cesium tetraoxalate containing 21,000 curies of cesium 137, a yield of 68 percent. The aluminum content thereof was less than 0.1 weight percent. The crystallized cesium tetraoxalate was removed by filtration, heated to 200° C. and held at this temperature for a period of 2 hours to produce a cesium acid oxalate product. The cesium acid oxalate product was then ground and blended with lithium carbonate, cadmium oxide and silica in proportions such as to produce a composition upon being fused of 47.8 weight percent cesium oxide, 1.1 weight percent lithium oxide, 41.9 weight percent silica and 9.2 weight percent cadmium oxide. Weighed portions of this mixture were loaded into graphite trays, melted in a furnace and cooled to produce bars of glass. The yield was 8 bars of glass 10 inches long by 1.25 inches wide and 0.25 inch thick, each containing 2500 curies of cesium 137. The product bars were smooth and free of cracks.

The above examples are merely illustrative and are not to be understood as limiting the scope of my invention, which is limited only as indicated by the appended claims. It is also to be understood that variations in apparatus and procedure may be employed by one skilled in the art without departing from the scope of my invention.

Having thus described my invention, I claim:

1. The method of recovering radioactive cesium values from an aqueous solution containing the same together with aluminum values and sulfate values which comprises reacting said solution with oxalic acid whereby cesium tetraoxalate is formed and separating said cesium tetraoxalate from the resulting solution.

2. The method of recovering radioactive cesium values from radioactive cesium alum which comprises dissolving said alum in an aqueous oxalic acid solution at a temperature above 50° C., cooling the resulting solution to a temperature below 20° C. whereby cesium tetraoxalate is crystallized and separating the resulting solids from the remaining solution.

3. The method of recovering radioactive cesium values from radioactive cesium alum which comprises dissolving said alum in an aqueous oxalic acid solution at a temperature of about 50° C. to 70° C., cooling the resulting solution to a crystal-seeding temperature of about 28° C. to 32 C., holding said solution at said crystal-seeding temperature for at least 5 minutes, whereby cesium tetraoxalate seed crystals are formed, cooling the resulting seeded solution to a temperature below 20° C. at a temperature decrease rate not exceeding about 30° C. per hour, whereby the major portion of said cesium values are crystallized, and separating the resulting solids from the remaining solution.

4. The method of preparing a radioactive cesium-containing solid suitable for incorporation into a glass radiation source which comprises dissolving radioactive cesium alum in an aqueous oxalic acid solution, crystallizing cesium tetraoxalate in the resulting solution, separating the resulting crystallized material from the remaining solution and heating said crystallized material at a temperature of about 170° C. to 240° C. whereby a cesium acid oxalate product is formed.

5. The method of preparing a cesium-bearing radiation source which comprises dissolving radioactive cesium alum in an aqueous oxalic acid solution, crystallizing cesium tetraoxalate in the resulting solution, separating the resulting crystallized material from the remaining solution, heating said crystallized material at a temperature of about 170° C. to 240° C. whereby a cesium acid oxalate product is formed, mixing said cesium acid oxalate product at a proportion of 14 to 61 weight percent of the resulting mixture with silica at a proportion of 30 to 62 weight percent, cadmium oxide at a proportion of 8 to 13 weight percent and lithium carbonate at a proportion of 0 to 11 weight percent, melting the resulting mixture and cooling the resulting melt whereby cesium-bearing solid glass is obtained.

6. The method of preparing a cesium-bearing radiation source which comprises dissolving radioactive cesium 137 alum in an aqueous oxalic acid solution at a temperature of about 50° C. to 70° C., cooling the resulting solution to a crystal-seeding temperature of about 28° to 32° C., holding said resulting solution at said crystal-seeding temperature for at least about 5 minutes whereby cesium tetraoxalate seed crystals are formed, cooling the resulting seeded solution to a temperature below 20° C. at a rate not exceeding about 30° C. per hour, whereby the major portion of said cesium values are crystallized as cesium tetratoxalate, separating the resulting solids from the remaining solution, heating said solids to a temperature of about 170° C. to 240° C. whereby a cesium acid oxalate produce is formed, mixing said cesium acid oxalate product at a proportion of 14 to 61 weight percent of the resulting mixture with silica at a proportion of 30 to 62 weight percent, cadmium oxide at a proportion of 8 to 13 weight percent and lithium carbonate at a proportion of 0 to 11 weight percent, melting the resulting mixture and cooling the resulting melt whereby cesium-bearing solid glass is obtained.

No references cited.

UNITED STATES PATENT OFFICE
CERTIFICATE OF CORRECTION

Patent No. 3,124,538                                          March 10, 1964

Robert E. Lewis

It is hereby certified that error appears in the above numbered patent requiring correction and that the said Letters Patent should read as corrected below.

Column 3, line 31, for "20° C." read -- 240° C. --; column 4, line 29, for "typically" read -- typical --; line 41, for "15 C." read -- 15° C. --; line 42, for "acesium" read -- a cesium --; column 5, line 41, for "32 C." read -- 32° C. --; column 6, line 36, for "tetratoxalate" read -- tetraoxalate --; line 39, for "produce" read -- product --.

Signed and sealed this 14th day of July 1964.

(SEAL)

Attest:

ESTON G. JOHNSON
Attesting Officer

EDWARD J. BRENNER
Commissioner of Patents